US010620751B2

(12) United States Patent
Crowther et al.

(10) Patent No.: US 10,620,751 B2
(45) Date of Patent: *Apr. 14, 2020

(54) MANAGEMENT OF A TOUCHSCREEN INTERFACE OF A DEVICE

(71) Applicant: International Business Machines Corporation, Armonk, NY (US)

(72) Inventors: Fiona M. Crowther, Lancashire (GB); Geza Geleji, Eastleigh (GB); Christopher J. Poole, Romsey (GB); Martin A. Ross, Gosport (GB); Craig H. Stirling, Winchester (GB); Ian T. Stirling, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,723

(22) Filed: Mar. 6, 2019

(65) Prior Publication Data

US 2019/0196656 A1  Jun. 27, 2019

Related U.S. Application Data

(63) Continuation of application No. 15/819,163, filed on Nov. 21, 2017, which is a continuation of application No. 14/684,564, filed on Apr. 13, 2015, now Pat. No. 9,910,540.

(51) Int. Cl.
G06F 3/041 (2006.01)
G06F 1/16 (2006.01)
G06F 3/0488 (2013.01)

(52) U.S. Cl.
CPC .......... G06F 3/0418 (2013.01); G06F 1/1626 (2013.01); G06F 1/1643 (2013.01); G06F 3/04886 (2013.01)

(58) Field of Classification Search
CPC ...... G06F 3/0418; G06F 3/04886; G06F 3/17; G06F 3/041; G06F 3/0416; G06F 3/0488; G06F 1/643; G06F 2200/1614; G06F 2200/1637
See application file for complete search history.

(56) References Cited

U.S. PATENT DOCUMENTS 8,692,777 B2    4/2014  Staton et al.
9,804,707 B2   10/2017  Durojaiye et al.
9,910,540 B2    3/2018  Crowther et al.
(Continued)

OTHER PUBLICATIONS

Schaub et al., "Broken Display = Broken Interface? The Impact of Display Damage on Smartphone Interaction", CHI 2014, Apr. 26-May 1, 2014, Toronto, ON, Canada, 2014 ACM, 10 pages.
(Continued)

Primary Examiner — Dong Hui Liang
(74) Attorney, Agent, or Firm — L. Jeffrey Kelly

(57) ABSTRACT

Method and system are provided for management of a touchscreen interface of a device. The method includes monitoring touchscreen interface function by logging data relating to user interaction with locations of the touchscreen interface. The logged data is then analyzed to identify one or more areas of the touchscreen interface which are inactive. The remaining active areas of the touchscreen interface are modeled to form a modified touchscreen interface. An original touchscreen interface is then mapped to the modified touchscreen interface resulting in only use of the remaining active areas.

20 Claims, 7 Drawing Sheets

(56) References Cited

U.S. PATENT DOCUMENTS

| | | | |
|---|---|---|---|
| 2004/0183787 | A1 | 9/2004 | Geaghan et al. |
| 2008/0062151 | A1 | 3/2008 | Kent |
| 2008/0231604 | A1 | 9/2008 | Peterson |
| 2011/0007028 | A1 | 1/2011 | Curtis et al. |
| 2011/0050620 | A1 | 3/2011 | Hristov |
| 2011/0260993 | A1 | 10/2011 | Liu |
| 2012/0036468 | A1 | 2/2012 | Colley |
| 2012/0185260 | A1 | 7/2012 | Perez et al. |
| 2012/0245447 | A1 | 9/2012 | Karan et al. |
| 2012/0268413 | A1 | 10/2012 | Narasimhan et al. |
| 2013/0100037 | A1 | 4/2013 | Mabie et al. |
| 2014/0306905 | A1 | 10/2014 | Kim et al. |
| 2014/0320437 | A1 | 10/2014 | Kang |
| 2015/0084877 | A1 | 3/2015 | Wang |
| 2015/0193074 | A1 | 7/2015 | Cudak et al. |
| 2015/0324030 | A1 | 11/2015 | Jun et al. |
| 2018/0095603 | A1 | 4/2018 | Crowther et al. |

OTHER PUBLICATIONS

Mikuro, "How I managed to use my Android device with a broken touch screen", Android, http://www.reddit.com/r/Android/comments/1r2zha/how_i_managed_to_use_my_android_device_with_a, Accessed on Mar. 30, 2015, 17 pages.

Mohr, "How to fix a broken touchscreen", http://www.in.techradar.com/news/phone-and-communications/mobile-phone/How-to-fix-a-broken-touchscreen/articleshow/38948974.cms, Nov. 25, 2012, Accessed on Mar. 27, 2015, 14 pages.

Price, "How to fix a scratched, cracked or broken smartphone screen", Tech Advisor Blog, http://www.techadvisor.co.uk/how-to/mobile-phone/how-fix-smartphone-screen/, Aug. 23, 2013, 8 pages, Accessed on Mar. 27, 2015.

Technobezz, "How to Fix touchscreen problems in iPhone 5?", http://www.technobezz.com/forums/topic/how-to-fix-touchscreen-problems-in-iphone-5/, 5 pages, Accessed on Mar. 27, 2015.

Agomuoh, "Samsung Galaxy Note 3 Release: How to Shrink and Move Your Screen for Easy Accessibility", International Business Times, http://www.ibtimes.com/samsung-galaxy-note-3-release-how-shrink-move-your-screen-easy-accessibility-1417714, 2 pages, Accessed on Mar. 27, 2015.

Microsoft, "Surface touchscreen: problems with touch", Microsoft Surface, http://www.microsoft.com/surface/en-gb/support/hardware-and-drivers/troubleshoot-the-surface-touchscreen, 6 pages, Accessed on Mar. 27, 2015.

Gunther, "How to Setup Galaxy Note 3 Keyboard for One-handed Use", Published 5 years ago on Oct. 7, 2013, Android, 4 pages.

IBM: List of IBM Patents or Patent Applications Treated as Related (Appendix P), Mar. 6, 2019, 2 pages.

MANAGEMENT OF A TOUCHSCREEN INTERFACE OF A DEVICE

BACKGROUND

The present invention relates to touchscreen interfaces of devices and more specifically, to management of a touchscreen interface to compensate for screen damage.

Many mobile or cell phones and tablets use touchscreens for the main user interface for their functionality. Touchscreens are also provided on terminals such as game consoles, personal computers, satellite navigation devices, eBooks, etc.

Touchscreens are electronic visual displays that a user can control though touch and gestures by one or more fingers, a stylus or pen.

A wide variety of touchscreen technologies have been developed and this is a field of continuing rapid development. Touchscreen technologies include: resistive touchscreens using electrically-resistive layers separated by a thin space; capacitive touchscreen panels consisting of an insulator such as glass coated with a transparent conductor; surface acoustic wave technology touchscreens using ultrasonic waves that pass over the touchscreen panel; infrared grid touchscreens using an array of infrared light emitting diodes and photo detector pairs; etc.

All touchscreens are susceptible to damage. Mobile devices are also increasingly being used in a wide range of situations, which increases their risk of damage. Damage may result in only a portion of the screen being rendered unusable.

Replacement of touchscreens is possible but may be inconvenient and expensive. Therefore, a temporary or cost effective solution to a partially damaged screen is needed in order to enable a user to carry on using the device effectively until the damage is resolved by screen replacement or repair.

In addition, there may be some damage in the mechanism below the screen which replacement of the screen may not resolve. In such cases, a solution for using the remaining functional area of the screen may be needed.

Therefore, there is a need in the art to address the aforementioned problems.

SUMMARY

According to a first aspect of the present invention there is provided method for management of a touchscreen interface of a device, comprising: monitoring touchscreen interface function by logging data relating to user interaction with locations of the touchscreen interface; analyzing the logged data to identify one or more areas of the touchscreen interface which are inactive; modeling the remaining active areas of the touchscreen interface to form a modified interface; and mapping an original touchscreen interface to the modified interface resulting in only use of the remaining active areas.

This method has the advantage that it enables a touchscreen interface to continue to be used when a portion of the interface is damaged or otherwise in operable.

Logging data relating to user interaction with locations of the touchscreen interface may log data for different application graphical user interfaces. This enables different uses of the touchscreen to be monitored and evaluated.

Analyzing the logged data may learn from user interactions with locations of the touchscreen interface. Analyzing the logged data may apply rules and thresholds to determine if an area is inactive. Analyzing the logged data may include dividing the touchscreen interface into discrete areas and determining if each area is active or inactive; and wherein the step of modeling may use the discrete areas to build the model. The different forms of analysis may enable learning of user habits and determining differing behavior suggesting user interface inoperability of areas.

The step of monitoring touchscreen interface function may include: invoking a training interaction prompting a user to interact with a touchscreen interface in a known manner. This enables a user to prompt the monitoring due to a known problem with the touchscreen interface.

The method may include providing visual feedback of the one or more areas of the touchscreen interface which are inactive or active. A visual indication to the user may be beneficial if the damage is not visible on the touchscreen interface.

Monitoring touchscreen interface functions may include: recording usage of locations of the touchscreen interface over time and logging success or failure of interactions at locations.

Monitoring touchscreen interface functions may further include: recording usage of graphical user interface elements and the success or failure of interactions with the elements and the locations of the elements in the touchscreen interface.

Monitoring touchscreen interface functions may still further include: monitoring motion of the device or rotation of the device display and recording such monitored motion or rotation in relation to interaction with the touchscreen interface.

Monitoring touchscreen interface functions may include: monitoring a user's finger motion towards the device and recording such monitored motion in relation to interaction with the touchscreen interface.

According to a second aspect of the present invention there is provided a system for management of a touchscreen interface of a device, comprising: a monitoring component for monitoring touchscreen interface function by logging data in a database relating to user interaction with locations of the touchscreen interface; a data analyzing component for analyzing the logged data to identify one or more areas of the touchscreen interface which are inactive; a modeling component for modeling the remaining active areas of the touchscreen interface to form a modified interface; and a virtual interface mapping component for mapping an original touchscreen interface to the modified interface resulting in only use of the remaining active areas.

The monitoring component for logging data relating to user interaction with locations of the touchscreen interface may log data for different application graphical user interfaces.

The data analyzing component for analyzing the logged data may apply rules and thresholds to determine if an area is inactive.

The analyzing component for analyzing the logged data may include dividing the touchscreen interface into discrete areas and determining if each area is active or inactive; and wherein the modeling component uses the discrete areas to build the model.

The system may include a training component for invoking a training interaction prompting a user to interact with a touchscreen interface in a known manner.

The system may also include a feedback component for providing visual feedback of the one or more areas of the touchscreen interface which are inactive or active.

According to a third aspect of the present invention there is provided a computer program product for management of a touchscreen interface of a device, the computer program product comprising a computer readable storage medium having program instructions embodied therewith, the program instructions executable by a processor to cause the processor to: monitor touchscreen interface function by logging data relating to user interaction with locations of the touchscreen interface; analyze the logged data to identify one or more areas of the touchscreen interface which are inactive; model the remaining active areas of the touchscreen interface to form a modified interface; and map an original touchscreen interface to the modified interface resulting in only use of the remaining active areas.

According to a fourth aspect of the present invention there is provided a method substantially as described with reference to the figures.

According to a fifth aspect of the present invention there is provided a system substantially as described with reference to the figures.

The described aspects of the invention provide the advantage of enabling effective use of only a portion of a touchscreen.

BRIEF DESCRIPTION OF THE SEVERAL VIEWS OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings.

Preferred embodiments of the present invention will now be described, by way of example only, with reference to the following drawings in which.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Method and system are described for management of a touchscreen interface of a device. Monitoring of a touchscreen interface may be carried out to obtain information and determine if areas of the touchscreen are non-responsive. The non-responsiveness of the areas may be due to damage to the touchscreen of various forms, which may be visible or may be in hidden aspects of the touchscreen.

Responsive to locating unusable non-responsive areas, the obtained information may be used to model a portion of the touchscreen that is active, excluding the non-responsive areas. The active portion may be one or more discrete areas of the touchscreen. For example, if the touchscreen is damaged across of central band area, this may leave two active portions above and below the damage.

A virtual screen layout may then be rearranged based on this model so that it only uses the active areas. This method provides a model that will intelligently determine which sections of the screen are non-responsive to touch and will alter the touchscreen interface to allow as close to a full range of operations as possible. This may involve management of the user interface to resize it, divide it into one or more areas, and rearrange control elements or graphics within the user interface.

The touchscreen interface generally corresponds to a display interface of the device. The display interface may also be modified in a corresponding manner to reflect the rearrangement of the touchscreen interface.

The described method provides logic to determine which sections of a touchscreen interface are inactive and inoperable and then uses this information to recalibrate the device's interface and display so that it only utilizes the sections of the touchscreen which are active, so that users can still operate the device after a screen breakage or other damage.

Figure 1:
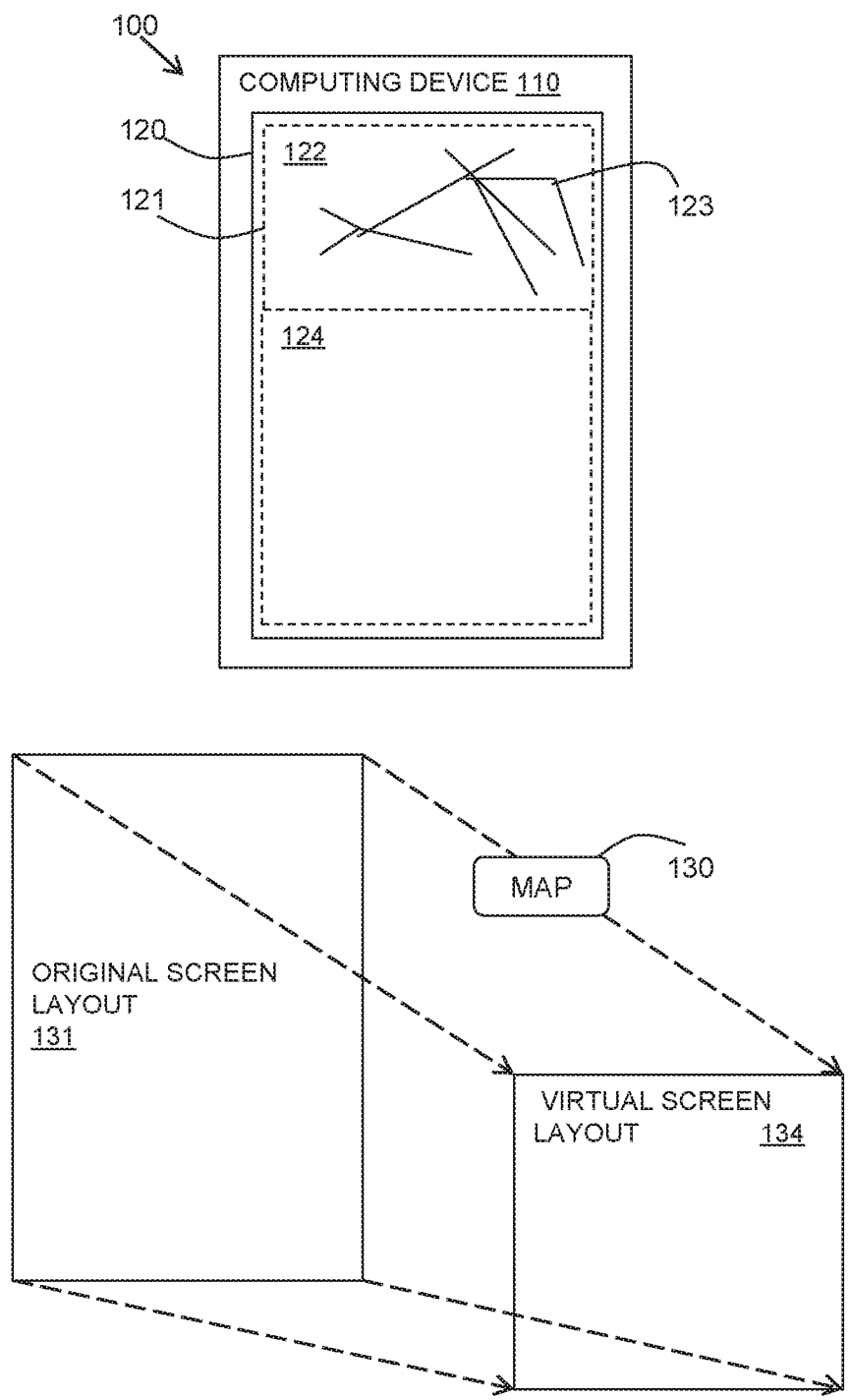
FIG. 1 is a schematic diagram of elements used in a method in accordance with the present invention.

With reference to FIG. 1, a schematic diagram 100 illustrates the described method. A computing device 110 having a touchscreen interface 120 is shown. The touchscreen interface 120 includes a display of images and touchscreen operation by user interaction with the touchscreen interface 120. The user interaction may be with reference to displayed elements, such as buttons or selectable components, or may be general gestures for issuing commands or navigating the display.

The touchscreen interface 120 has an original area 121, which is useable for touchscreen operations. With reference to FIG. 1, part of the touchscreen interface 120 is an inactive area 122 due to damage in the form of a crack 123 in the screen preventing the touchscreen interface 120 from functioning fully in this area. A remaining active area 124 of the touchscreen interface 120 is determined and used using the described method.

The method provides a mapping 130 of the original screen layout 131 and the functions provided in the original screen layout of graphical user interfaces to a virtual screen layout 134 corresponding to the remaining active area 124.

Figure 2:
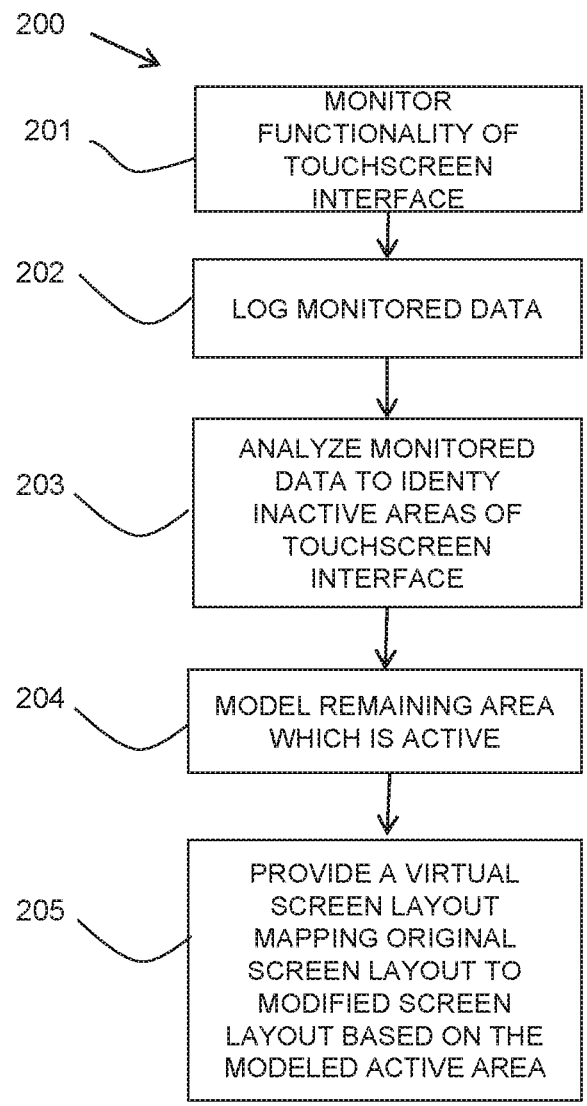
FIG. 2 is a flow diagram of an example embodiment of a method in accordance with the present invention.

Referring to FIG. 2, a flow diagram 200 shows an embodiment of the described method. The described functionality of the method may be provided by the operating system of the device, by application software installed on the device, or as a combination of the two.

The touchscreen interface function may be monitored 201 to determine the operational areas of the touchscreen interface. The monitoring 201 may be carried out as a background process, which continually monitors the results of the use of the touchscreen interface. Alternatively or additionally, an ad-hoc monitoring 201 may be carried out at the request of a user, for example, if they believe that part of the touchscreen interface is not functioning.

The monitoring 201 may include many different aspects, which monitor different functions, uses and/or activities of the touchscreen interface. The monitored aspects may be logged 202 in a database. Some monitored aspects are listed below.

A set of touchscreen areas' usage over time may be recorded to identify whether any of the touchscreen areas are no longer used. The touchscreen may be divided into a set of areas. The frequency and times of successful operations in different areas of the touchscreen may be recorded and logged. This may identify inactive areas.

The location of each virtual button per display position may be logged and the success or failure of pressing each virtual button may be recorded. This may be carried out by recording and logging a history of buttons pressed and which section of the screen they were in when successfully used.

Screen rotations may be recorded to identify instances where a virtual button works in one aspect of a landscape or portrait display, but not the other. It is possible for a user to circumvent the problem of broken sections of a touchscreen by rotating the device to move the buttons to working sections. The monitoring may learn from the user performing these manual circumvention options. Device motion and/or screen display rotation may be recorded and logged just prior to a success.

Finger motion towards the touchscreen may be detected, for example, using the device's camera and a record kept of success and no success of subsequent actions indicating active areas and inactive areas respectively. A timing window post this event may exist say for 10 seconds and it will record the area touched with a successful action.

A training process may be carried out as an ad-hoc monitoring 201 of a touchscreen interface. The training process is described further below and involves pre-defined user actions, which are monitored to determine inactive areas of the touchscreen interface.

The monitored data may be logged 202 with reference to areas of the touchscreen interface. The areas may be referenced in a grid of coordinates of the touchscreen interface and may be of varying size and may include areas of individual pixel size, regular areas of several pixel wide squares, to larger areas representing the location of an interface button display.

The logged data may be stored in a database, which may be internal to the device. The logged data may include a reference to the original location in the touchscreen interface, an application or program using the interface, and whether the interaction was successful. For example, this may be recorded as: "LOCATION:APPLICATION:SUCCESS?". The location of user interface interactions, such as buttons, applications, or selectable components, in a graphical user interface for a given use of the interface by an application or program is known and logged against an area or segment. The success or failure of such user interface interactions is logged.

If there are differences between the original area recorded for the user interface interaction for an application and the one used by a user, this is noted and an indication made against the original location or area that it may have problems.

The monitored and logged data may be analyzed 203 to identify one or more areas of the touchscreen interface as being inactive enabling the method to model 204 the remaining area, which is active. This may include applying threshold measures to the likelihood that an area is inactive due to the analysis of the logged area.

The method may then provide 205 a virtual screen layout mapping the original screen layout to a modified screen layout based on the modeled active area. The mapping may transform user interfaces for the operating system and applications to map the original area of the user interface to the modeled remaining area or areas. The mapping may resize the user interface, divide into discrete areas, rearrange control elements and graphical elements, etc.

Known methods of resizing a user interface may be used, for example, as known in large form factor devices which allow resizing of the user interface for single-handed use by restricting the user interface area to one portion of the touchscreen.

The outcome of the model is a modified screen layout avoiding inactive sections of the touchscreen interface. The active portion may be one or more discrete areas of the touchscreen and the modified screen layout may make use of the discrete areas and may display the modified screen layout accordingly. For example, if the touchscreen is damaged across of central band area, this may leave two active portions above and below the damage.

Additionally, inactive areas may be identified through a use of color or other display on the touchscreen interface.

Figure 3:
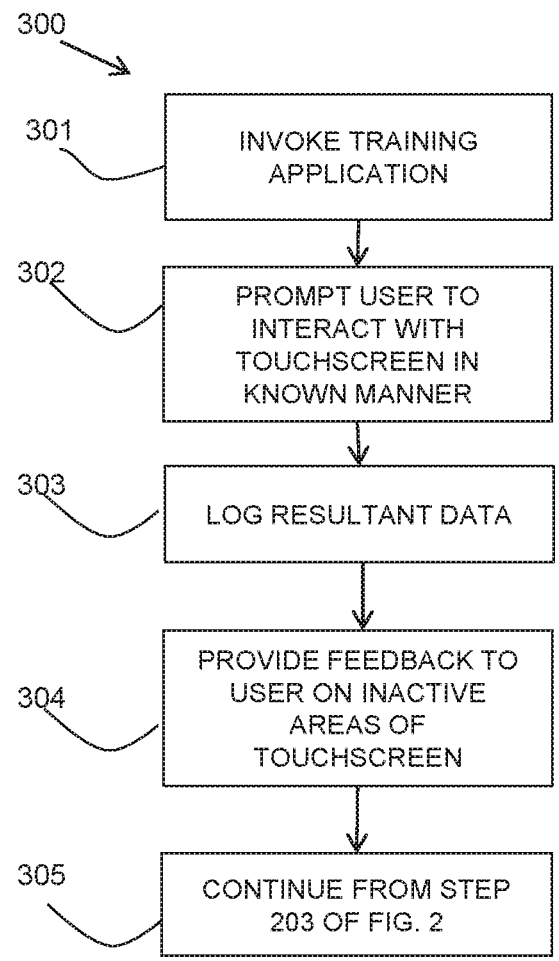
FIG. 3 is a flow diagram of an example embodiment of an aspect of a method in accordance with the present invention.

Referring to FIG. 3, a flow diagram 300 shows an aspect of the described method of providing a training program for a touchscreen interface. This may be provided as a software application based tool.

This method may be invoked 301 by a user who is experiencing difficulties with a touchscreen and may be in addition to a background monitoring as described in step 201 of FIG. 2 or as an alternative monitoring procedure.

The method may prompt 302 the user to interact with the touchscreen interface in a known manner. For example, the user may be asked to run their finger across the touchscreen in a defined pattern. The pattern may be displayed to the user on the touchscreen interface, for example, as a arrow to follow. The resultant data may be logged 303 for analysis.

Direct feedback may be provided 304 by coloring the screen as the user touches it. In one embodiment, active regions may be colored and inactive regions may remain uncolored. In another embodiment, the entire screen may start as red and touching pixels in an active area may turn it from red to green. If the user follows a directed route the final result will be all green except for the areas that are unresponsive that will remain red.

The method may then proceed 305 as from step 203 of FIG. 2 with analysis of the inactive regions. This may provide a manual counterpart to the monitoring described above in step 201 of FIG. 2.

Example

A touchscreen interface is cracked and the top 20% of the display in the portrait position is non-responsive. The other 80% is working normally.

Inputs to Model

Location of the damage is modeled using one or more of the described techniques.

Data may be built up of how often small areas of the screen (for example, 5 mm squares) are touched over time. If it is logged that in the past week, a certain region that is usually tapped often now has not been tapped, the region may be marked as inactive. Additionally, it may be possible to analyze contiguous dead areas to trace out cracks. This step provides learning data by use of the touchscreen interface.

The location of each button per display position may be logged with a screen section. For example, the display may be divided into sections of 4 areas across and down in which buttons may be provided. If a successful use of a button is recorded, the location and success will be logged. A record of button position and screen section and the time of last success in this section will be recorded and logged.

When a successful action is recorded, a record may be made of the time and any screen rotation which might have altered the display prior to the successful action.

Finger motion to the screen may be detected and a record of subsequent action success or no success may be logged.

Decision Making Layer

Using the logged information above the model may determine for each small area of the touchscreen interface if it is active or inactive. A threshold measurement may be made as to the likelihood that an area is inactive. This may be carried out at the granularity of screen pixels or slightly larger areas, for example, 5 mm squares.

Output

The tool may map the original screen layout to a modified screen layout to avoid putting user interactions in areas where the chance of inactivity is high. The user interface is therefore altered to accommodate the inactive areas.

In the given example, when in portrait position the top 20% of the phone will not have anything requiring touch interaction and, optionally, nothing requiring display.

The monitoring logic and decision-making layer may be provided in the operating system of a device having a touchscreen interface. When a problem is determined by this logic the operating system may map a graphical user interface using the model.

In one embodiment, the user may be prompted to download an application to assist the process. For example, an application may be provided for the ad-hoc monitoring tool. In another example, an application may be provided for mapping the graphical user interfaces of different types of programs having displays and user interfaces.

Figure 4A:
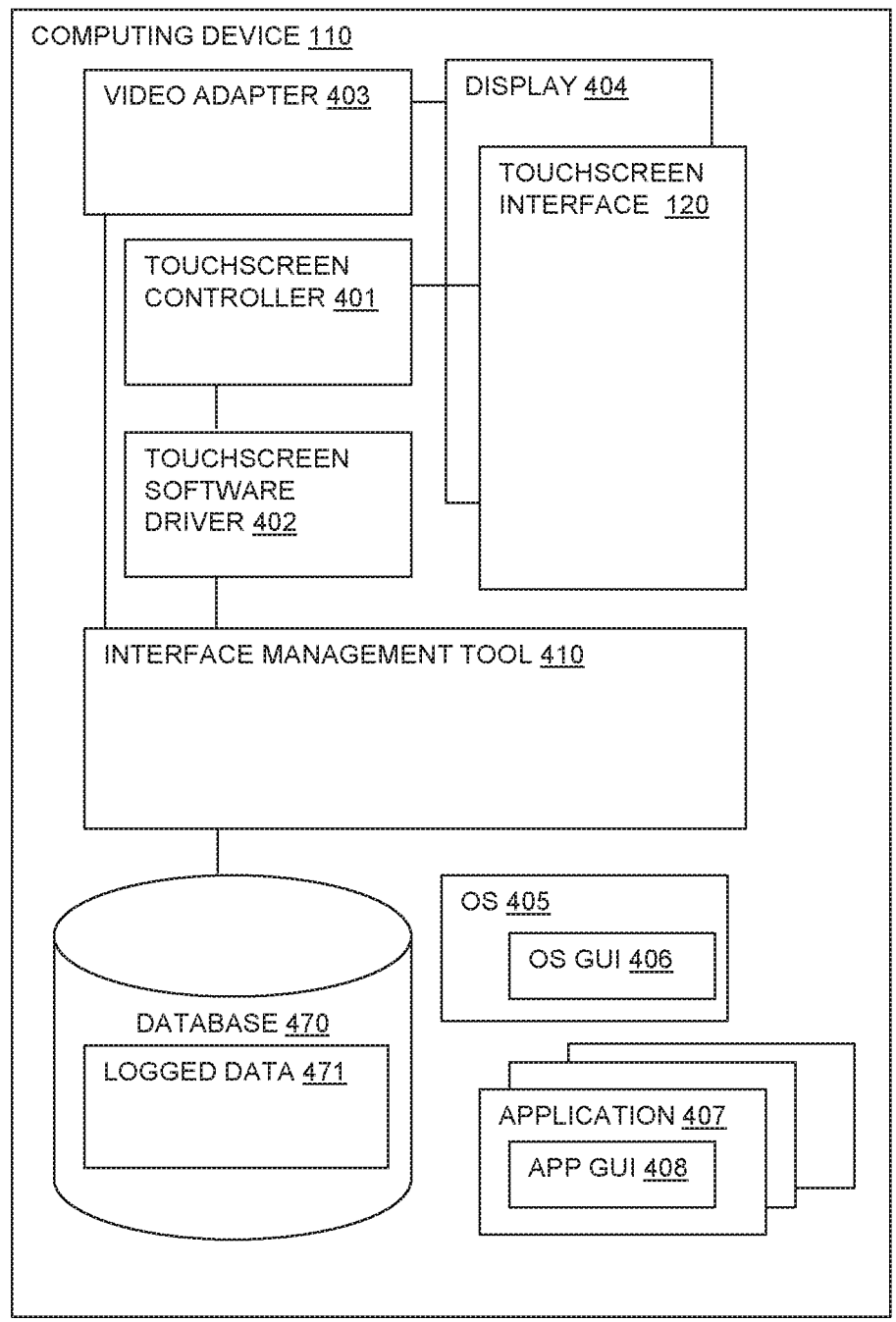
FIGS. 4A and 4B are block diagrams of an example embodiment of a system in accordance with the present invention.
Figure 4B:
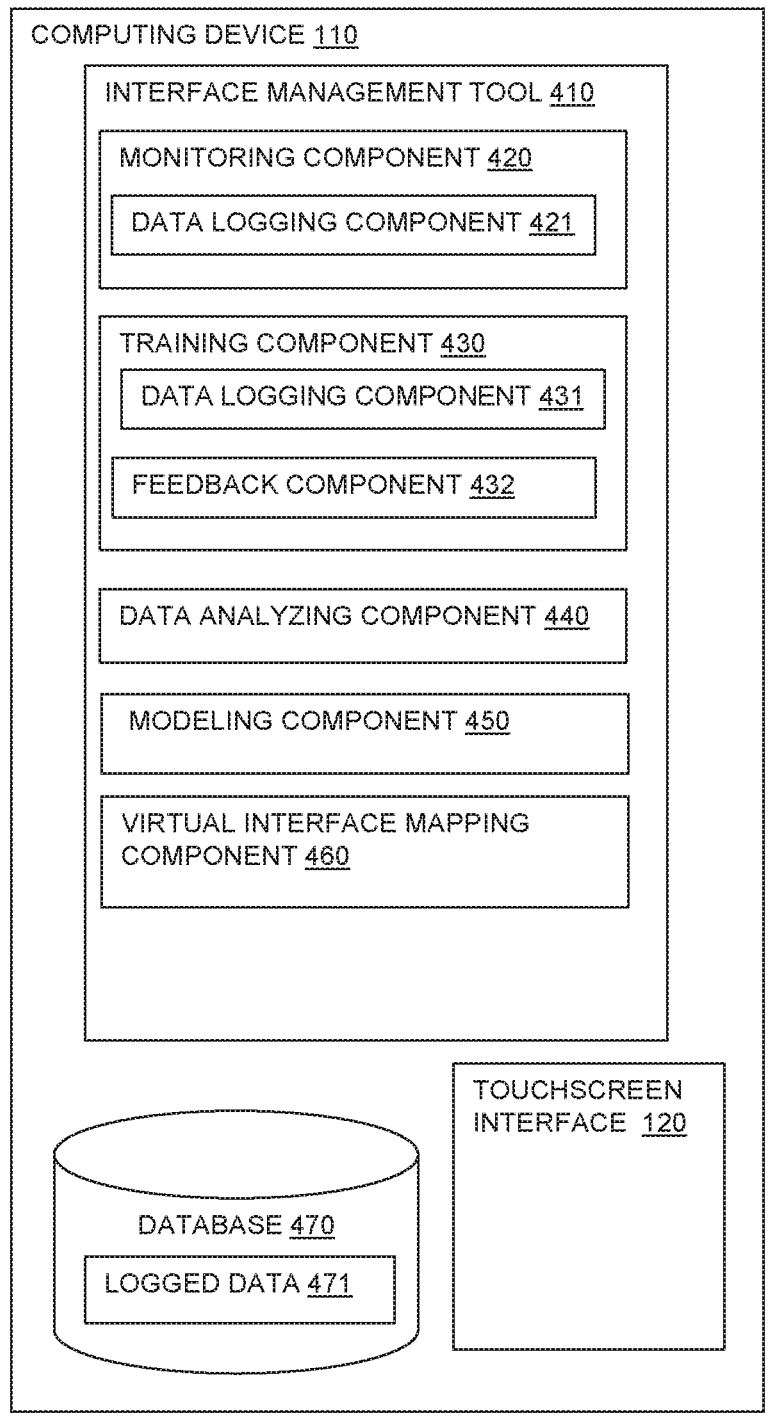

Referring to FIGS. 4A and 4B, block diagrams show embodiments of the described system.

A computing device 110 is shown having a touchscreen interface 120 that also provides a display interface 404. As is known, a display interface 404 may be controlled by a video adapter 403 that generates a feed of output images to the display interface 404. A touchscreen interface 120 generally has a touchscreen controller 401, which accepts user interaction inputs and converts to commands and a touchscreen software driver 402 for providing software functionality.

An operating system 405 and applications 407 running on the computing device 110 have graphical user interfaces (GUIs) 406, 408, which enable displayed on the display interface 404 of visual graphics including graphical elements providing user indications and icons.

The described system provides an interface management tool 410 which is described in more detail with reference to FIG. 4B. The interface management tool 410 may interact with the video adapter 403, touchscreen controller 401, and touchscreen software driver 402 to modify the display and interaction with GUIs 406, 408 to compensate for inactive areas of the touchscreen interface 120.

The interface management tool 410 stores data to and references a database 470 of logged data 471 relating to the use of the touchscreen interface 120.

The functionality of the interface management tool 410 may be provided in the operating system 405 or in an application 407 or a combination of the two.

Referring to FIG. 4B, the interface management tool 410 may include a monitoring component 420 and a data logging component 421 for monitoring areas of the touchscreen interface 120 with respect to operation of GUIs 406, 408 of applications 405, 407 and the success of such interactions in the operations.

Optionally, a training component 430 may be provided, for example, as a separate application, for monitoring of the touchscreen interface 120 at a specific time in response to a user need. The training component 430 may provide user instructions to interact with the touchscreen interface 120 in a specific manner and the results may be recorded. The training component 430 may include a data logging component 431 and a feedback display component 432.

The interface management tool 410 may include a data analyzing component 440 for analyzing the logged data 471 with respect to the operation of the touchscreen interface 120 to identify inactive areas. A modeling component 450 may model the remaining active area of the touchscreen interface 120 and a virtual interface mapping component 460 may map the original screen layout to a modified screen layout based on the modeled active area.

The virtual interface mapping component 460 may apply the mapping by instructing the video adapter 403 and touchscreen controller 401 to change their display and user interactions for GUIs. This may be by resizing, re-organizing the GUIs, rearranging graphical and input elements, dividing into discrete areas, etc.

The technical problem addressed by the described method and system is the inoperability of portions of a touchscreen interface and modeling and mapping graphical user interfaces to provide full functionality of control elements and graphical elements in the remaining operable area or areas of the touchscreen interface.

Figure 5:
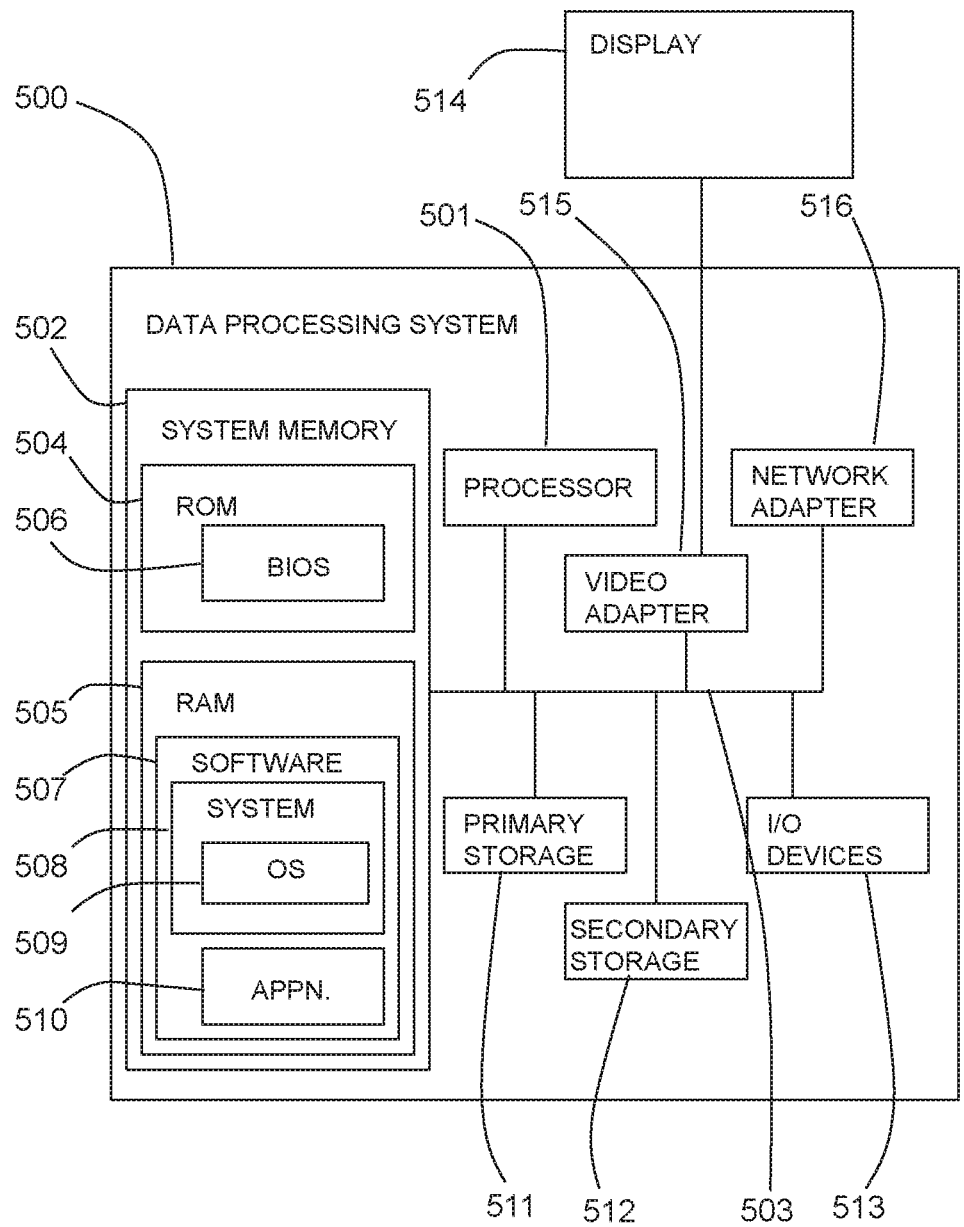
FIG. 5 is a block diagram of an embodiment of a data processing system in which the present invention may be implemented.

Referring to FIG. 5, an exemplary system for implementing aspects of the invention includes a data processing system 500 suitable for storing and/or executing program code including at least one processor 501 coupled directly or indirectly to memory elements through a bus system 503. The memory elements may include local memory employed during actual execution of the program code, bulk storage, and cache memories which provide temporary storage of at least some program code in order to reduce the number of times code must be retrieved from bulk storage during execution.

The memory elements may include system memory 502 in the form of read only memory (ROM) 504 and random access memory (RAM) 505. A basic input/output system (BIOS) 506 may be stored in ROM 504. Software 507 may be stored in RAM 505 including system software 508 such as operating system software 509. Software applications 510 may also be stored in RAM 505.

The system 500 may also include a primary storage means 511 such as a magnetic hard disk drive and secondary storage means 512 such as a magnetic disc drive and an optical disc drive. The drives and their associated computer-readable media provide non-volatile storage of computer-executable instructions, data structures, program modules and other data for the system 500. Software applications may be stored on the primary and secondary storage means 511, 512 as well as the system memory 502.

The computing system 500 may operate in a networked environment using logical connections to one or more remote computers via a network adapter 516.

Input/output devices 513 may be coupled to the system either directly or through intervening I/O controllers. A user may enter commands and information into the system 500 through a touchscreen interface as described herein. Output devices may include speakers, printers, etc. A display device 514 is also connected to system bus 503 via an interface, such as video adapter 515.

Figure 6:
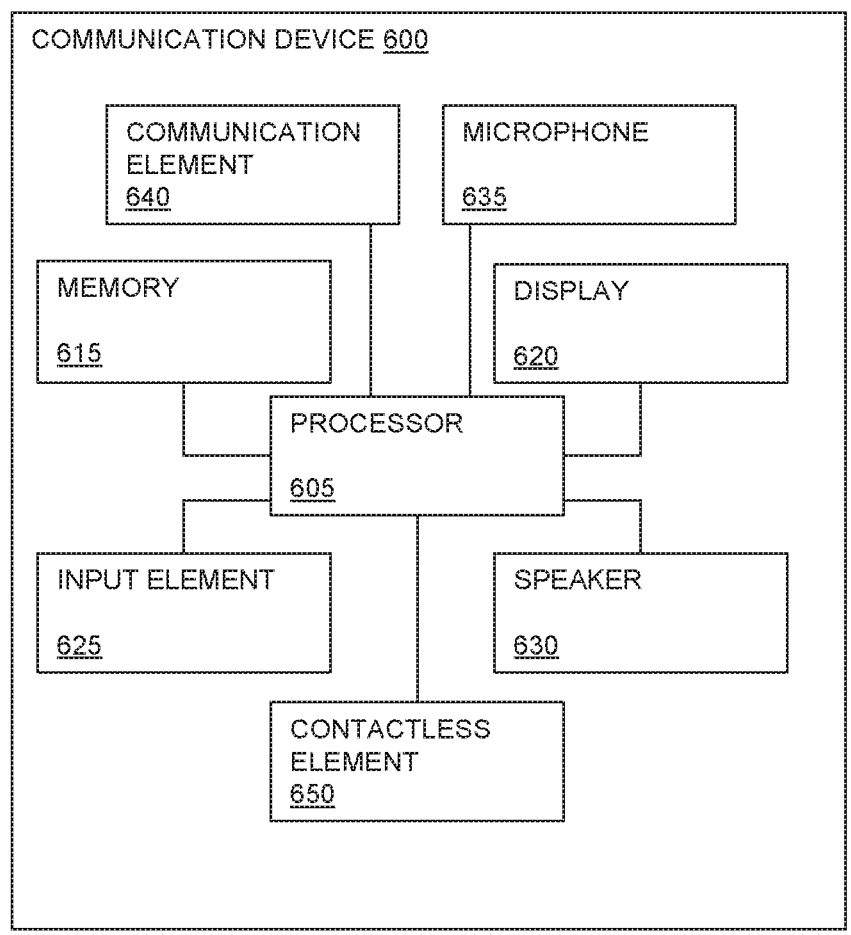
FIG. 6 is a block diagram of an embodiment of a communication device in which the present invention may be implemented.

FIG. 6 shows a block diagram of a communication device 600 that may be used in embodiments of the disclosure. The communication device 600 may be a cell phone, a smart phone, a satellite phone, or a computing device having a phone capability, including a wearable device such as glasses, watches, etc.

The communication device 600 may include a processor 605 (e.g., a microprocessor) for processing the functions of the communication device 600 and a display 620 to allow a user to see the phone numbers and other information and messages. The communication device 600 may further include an input element 625 in the form of a touchscreen interface as described herein, a speaker 630 to allow the user to hear voice communication, music, etc., and a microphone 635 to allow the user to transmit his or her voice through the communication device 600.

The processor 605 of the communication device 600 may connect to a memory 615. The memory 615 may be in the form of a computer-readable medium that stores data and, optionally, computer-executable instructions.

The communication device 600 may also include a communication element 640 for connection to communication channels (e.g., a cellular telephone network, data transmission network, Wi-Fi network, satellite-phone network, Internet network, Satellite Internet Network, etc.). The communication element 640 may include an associated wireless transfer element, such as an antenna.

The communication element 640 may include a subscriber identity module (SIM) in the form of an integrated circuit that stores an international mobile subscriber identity and the related key used to identify and authenticate a subscriber using the communication device 600. One or more subscriber identity modules may be removable from the communication device 600 or embedded in the communication device 600.

The communication device 600 may further include a contactless element 650, which is typically implemented in the form of a semiconductor chip (or other data storage element) with an associated wireless transfer element, such as an antenna. The contactless element 650 may be associated with (e.g., embedded within) the communication device 600 and data or control instructions transmitted via a cellular network may be applied to the contactless element 650 by means of a contactless element interface (not shown). The contactless element interface may function to permit the exchange of data and/or control instructions between mobile device circuitry (and hence the cellular network) and the contactless element 650.

The contactless element 650 may be capable of transferring and receiving data using a near field communications (NFC) capability (or near field communications medium) typically in accordance with a standardized protocol or data transfer mechanism (e.g., ISO 14443/NFC). Near field communications capability is a short-range communications capability, such as radio-frequency identification (RFID), Bluetooth, infra-red, or other data transfer capability that can be used to exchange data between the communication device 600 and an interrogation device. Thus, the communication device 600 may be capable of communicating and transferring data and/or control instructions via both a cellular network and near field communications capability.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Improvements and modifications can be made to the foregoing without departing from the scope of the present invention.

The invention claimed is:

1. A method for management of a touchscreen interface of a device having a display, the method comprising:
   identifying specific user interactions with a virtual button on the touchscreen interface with respect to both a portrait display position and a landscape display position;
   identifying manual circumvention of an inactive area of the touchscreen interface based on determining that the specific user interactions with the virtual button comprises switching user interactions with the virtual button between the portrait display position and the landscape display position and recording a successful interaction with the virtual button in only one of the portrait display position and the landscape display position, and recording an unsuccessful interaction with the virtual button in the other display position;
   identifying the inactive area of the touchscreen interface based on the identified manual circumvention; and
   mapping an original touchscreen interface to a modified touchscreen interface resulting in only use of remaining active areas.

2. The method according to claim 1, wherein a location of the virtual button on the touchscreen interface in the portrait display position is different from a location of the virtual button on the touchscreen interface in the landscape display position.

3. The method according to claim 1, wherein a location of the identified inactive area of the touchscreen interface is substantially the same as the location of the virtual button in the display position in which the specific user interactions with the virtual button were unsuccessful.

4. The method according to claim 1, wherein identifying specific user interactions with the virtual button on the touchscreen interface includes identifying specific user interactions for different application graphical user interfaces.

5. The method according to claim 1, wherein identifying manual circumvention of the inactive area of the touchscreen interface includes dividing the touchscreen interface into discrete areas and determining if each area is active or inactive; and wherein mapping the original touchscreen interface to the modified touchscreen interface uses the discrete areas to form the modified touchscreen interface.

6. The method according to claim 1, wherein identifying the specific user interactions with the virtual button on the touchscreen interface include invoking a training interaction prompting a user to interact with the touchscreen interface according to a pre-defined pattern displayed on the touchscreen interface.

7. The method according to claim 1, further comprising:
   changing the color of the touchscreen interface, in real-time, in response to a user interacting with the touchscreen interface according to a pre-defined pattern displayed on the touchscreen interface, wherein a first color indicates active areas of the touchscreen interface and a second color indicates inactive areas of the touchscreen interface.

8. A computer system for management of a touchscreen interface of a device having a display, the computer system comprising one or more computer processors, one or more computer-readable storage media, and program instructions stored on the one or more computer-readable storage media for execution by at least one of the one or more computer processors, the program instructions comprising:

program instructions to identify specific user interactions with a virtual button on the touchscreen interface with respect to both a portrait display position and a landscape display position;

program instructions to identify manual circumvention of an inactive area of the touchscreen interface based on determining that the specific user interactions with the virtual button comprises switching user interactions with the virtual button between the portrait display position and the landscape display position and recording a successful interaction with the virtual button in only one of the portrait display position and the landscape display position, and recording an unsuccessful interaction with the virtual button in the other display position;

program instructions to identify the inactive area of the touchscreen interface based on the identified manual circumvention; and program instructions to map an original touchscreen interface to a modified touchscreen interface resulting in only use of remaining active areas.

9. The computer system according to claim 8, wherein a location of the virtual button on the touchscreen interface in the portrait display position is different from a location of the virtual button on the touchscreen interface in the landscape display position.

10. The computer system according to claim 8, wherein a location of the identified inactive area of the touchscreen interface is substantially the same as the location of the virtual button in the display position in which the specific user interactions with the virtual button were unsuccessful.

11. The computer system according to claim 8, wherein the program instructions to identify specific user interactions with the virtual button on the touchscreen interface include program instructions to identify specific user interactions for different application graphical user interfaces.

12. The computer system according to claim 8, wherein the program instructions to identify the specific user interactions with the virtual button on the touchscreen interface include program instructions to invoke a training interaction prompting a user to interact with the touchscreen interface according to a pre-defined pattern displayed on the touchscreen interface.

13. The computer system according to claim 8, further comprising:

program instructions to change the color of the touchscreen interface, in real-time, in response to a user interacting with the touchscreen interface according to a pre-defined pattern displayed on the touchscreen interface, wherein a first color indicates active areas of the touchscreen interface and a second color indicates inactive areas of the touchscreen interface.

14. A computer program product for management of a touchscreen interface of a device having a display, the computer program product comprising one or more computer-readable storage media and program instructions stored on the one or more computer-readable storage media, the program instructions comprising:

program instructions to identify specific user interactions with a virtual button on the touchscreen interface with respect to both a portrait display position and a landscape display position;

program instructions to identify manual circumvention of an inactive area of the touchscreen interface based on determining that the specific user interactions with the virtual button comprises switching user interactions with the virtual button between the portrait display position and the landscape display position and recording a successful interaction with the virtual button in only one of the portrait display position and the landscape display position, and recording an unsuccessful interaction with the virtual button in the other display position;

program instructions to identify the inactive area of the touchscreen interface based on the identified manual circumvention; and program instructions to map an original touchscreen interface to a modified touchscreen interface resulting in only use of remaining active areas.

15. The computer program product according to claim 14, wherein a location of the virtual button on the touchscreen interface in the portrait display position is different from a location of the virtual button on the touchscreen interface in the landscape display position.

16. The computer program product according to claim 14, wherein a location of the identified inactive area of the touchscreen interface is substantially the same as the location of the virtual button in the display position in which the specific user interactions with the virtual button were unsuccessful.

17. The computer program product according to claim 14, wherein the program instructions to identify specific user interactions with the virtual button on the touchscreen interface include program instructions to identify specific user interactions for different application graphical user interfaces.

18. The computer program product according to claim 14, wherein the program instructions to identify manual circumvention of the inactive area of the touchscreen interface include program instructions to divide the touchscreen interface into discrete areas and determining if each area is active or inactive; and wherein mapping the original touchscreen interface to the modified touchscreen interface uses the discrete areas to form the modified touchscreen interface.

19. The computer program product according to claim 14, wherein the program instructions to identify the specific user interactions with the virtual button on the touchscreen interface include program instructions to invoke a training interaction prompting a user to interact with the touchscreen interface according to a pre-defined pattern displayed on the touchscreen interface.

20. The computer program product according to claim 14, further comprising:

program instructions to change the color of the touchscreen interface, in real-time, in response to a user interacting with the touchscreen interface according to a pre-defined pattern displayed on the touchscreen interface, wherein a first color indicates active areas of the touchscreen interface and a second color indicates inactive areas of the touchscreen interface.

\* \* \* \* \*